United States Patent [19]
Savage, Jr.

[11] Patent Number: 5,548,676
[45] Date of Patent: Aug. 20, 1996

[54] LIGHT PIPE OPTICAL COUPLING BETWEEN LED AND FIBER OPTICS CABLE

[76] Inventor: John M. Savage, Jr., 538-B Via De La Valle, Solana Beach, Calif. 90275

[21] Appl. No.: 391,113

[22] Filed: Feb. 21, 1995

Related U.S. Application Data

[63] Continuation-in-part of Ser. No. 278,246, Jul. 21, 1994, Pat. No. 5,440,658, which is a continuation-in-part of Ser. No. 142,938, Oct. 29, 1993, Pat. No. 5,466,174, which is a continuation-in-part of Ser. No. 82,963, Jun. 29, 1993, Pat. No. 5,368,503.

[51] Int. Cl.⁶ .................................................. G02B 6/42
[52] U.S. Cl. ........................................ 385/92; 385/88
[58] Field of Search ....................... 385/53, 88, 92–94, 385/136–139

[56] References Cited

U.S. PATENT DOCUMENTS

| | | | |
|---|---|---|---|
| D. 200,157 | 1/1965 | Vincent | D13/146 |
| 1,747,896 | 2/1930 | Gates | 439/682 |
| 2,042,199 | 5/1936 | Thomas | 362/226 |
| 2,396,725 | 3/1946 | Thomas, Jr. | 439/590 |
| 2,786,937 | 3/1957 | Arnejo | 362/308 |
| 2,796,593 | 6/1957 | Offerman | 439/683 |
| 2,829,359 | 4/1958 | Ritter | 439/56 |
| 2,949,595 | 8/1960 | Doeleman | 338/70 |
| 2,951,226 | 8/1960 | Gittens | 439/58 |
| 2,977,562 | 3/1961 | Benson | 439/58 |
| 2,999,895 | 9/1961 | Smith | 174/138 G |
| 3,184,536 | 5/1965 | Vincent | 174/138 G |
| 3,335,387 | 8/1967 | Mueller | 439/56 |
| 3,564,231 | 2/1971 | Bruce et al. | 385/88 X |
| 3,601,786 | 8/1971 | Brubaker | 439/853 |
| 3,621,445 | 11/1971 | Horecky et al. | 439/81 |
| 3,624,385 | 11/1971 | Wall | 385/88 X |
| 3,663,931 | 5/1972 | Brown | 439/75 |
| 3,721,815 | 3/1973 | Wall | 385/88 X |
| 3,887,803 | 6/1975 | Savage, Jr. | 362/363 |
| 3,975,072 | 8/1976 | Ammon | 439/70 |
| 4,035,681 | 7/1977 | Savage, Jr. | 313/110 |
| 4,195,330 | 3/1980 | Savage, Jr. | 362/226 |
| 4,219,172 | 8/1980 | Murayama | 248/27.3 |
| 4,230,387 | 10/1980 | Zahn | 439/590 |
| 4,398,240 | 8/1983 | Savage, Jr. | 362/311 |
| 4,402,110 | 9/1983 | Savage, Jr. | 16/225 |
| 4,461,537 | 7/1984 | Raymer, II et al. | 385/88 |
| 4,471,414 | 9/1984 | Savage, Jr. | 362/226 |
| 4,491,900 | 1/1985 | Savage, Jr. | 362/230 |
| 4,513,356 | 4/1985 | Mikola | 362/226 |
| 4,691,985 | 9/1987 | Shank et al. | 385/84 |
| 4,711,518 | 12/1987 | Shank et al. | 385/79 |
| 4,727,648 | 3/1988 | Savage, Jr. | 29/839 |
| 4,821,152 | 4/1989 | Lorenzen | 361/767 |
| 4,822,302 | 4/1989 | Dorleans | 439/544 |
| 4,837,927 | 6/1989 | Savage, Jr. | 29/839 |
| 4,986,625 | 1/1991 | Yamada et al. | 385/55 |
| 4,986,772 | 1/1991 | Fukutani | 439/892 |
| 5,068,771 | 11/1991 | Savage, Jr. | 362/255 |
| 5,071,375 | 12/1991 | Savage, Jr. | 439/853 |
| 5,163,109 | 11/1992 | Okugawa et al. | 385/94 |
| 5,193,099 | 3/1993 | Chou | 372/107 |
| 5,283,802 | 2/1994 | Hsiung | 372/107 |
| 5,288,242 | 2/1994 | Muzslay | 439/349 |
| 5,368,503 | 11/1994 | Savage, Jr. | 439/502 |
| 5,440,658 | 8/1995 | Savage, Jr. | 385/88 X |

FOREIGN PATENT DOCUMENTS

| | | |
|---|---|---|
| 2390032 | 12/1978 | France. |
| 1464176 | 2/1969 | Germany. |
| 2250007 | 5/1974 | Germany. |
| 2918620 | 11/1980 | Germany. |
| 2081516 | 2/1982 | United Kingdom. |

Primary Examiner—John D. Lee
Attorney, Agent, or Firm—William W. Haefliger

[57] ABSTRACT

In combination, a mounting structure having a longitudinal axis; an LED having a light emitter and a light-passing lens oriented along the axis; a cable having optical fibers defining a light entrance end in a location facing longitudinally toward the LED and spaced therefrom; and a light-reflecting light pipe located longitudinally between the LED lens and the cable entrance end.

30 Claims, 8 Drawing Sheets

LIGHT PIPE OPTICAL COUPLING BETWEEN LED AND FIBER OPTICS CABLE

BACKGROUND OF THE INVENTION

This application is a continuation-in-part of Ser. No. 08/278,246 filed Jul. 21, 1994 (now U.S. Pat. No. 5,440,658); which is a continuation-in-part of Ser. No. 08/142,938 filed Oct. 29, 1993 (now U.S. Pat. No. 5,466,174); which is a continuation-in-part of Ser. No. 08/082,963 filed Jun. 29, 1993, now U.S. Pat. No. 5,368,503 issued Nov. 29, 1994.

This invention relates generally to optical coupling of light sources and fiber optics cables, and more particularly, to optical coupling of light-emitting diodes (LEDs) to the light entrance ends of such cables.

Light refracting lenses have been proposed for such optical coupling purposes; however, efficient coupling is substantially reduced if the light emitters of LEDs are not axially centered relative to LED lenses.

There is need for improved apparatus and method to overcome such inefficiencies.

SUMMARY OF THE INVENTION

It is a major object to provide such improved apparatus and method. Basically, the invention comprises, in combination:

a) a mounting means having a longitudinal axis, b) an LED having a light emitter and a light-passing lens oriented along the axis, c) a cable having optical fibers defining a light entrance end in a location facing longitudinally toward the LED and spaced therefrom, and d) a light-reflecting light pipe located longitudinally between the LED lens and the cable entrance end.

Accordingly, even though the LED should be produced to have its emitter off axis, slightly, the efficiency of light coupling from the LED to the fiber optics cable entrance end will not be materially reduced.

Further objects include the provision of the light-refracting light pipe to taper toward the cable end, for efficient light coupling, the provision of such a light pipe to have a generally conical surface oriented to reflect light rays from the LED lens toward the cable entrance end; the provision and location of the light pipe to have a relatively large entrance end and a relatively small exit end, the entrance end proximate the LED lens, and the exit end proximate the cable entrance end.

Yet another object includes the provision of mounting means to include a tubular housing in which the light pipe is received, and a cable connector having barbs connecting to the cable, and/or the reception of the end of the tubular housing into the connector, with barb retention.

A further object includes the provision of a hollow connector connected to the mounting means and having a first portion to receive the cable and to position the cable entrance end relative to the light pipe, the connector having grip means thereon to grip the cable and to resist endwise withdrawal of the cable relative to the connector and mounting means. As will be seen, the grip means advantageously comprises barbs on the connector.

Yet another object includes provision of a mounting panel to which the hollow connector is connected, the hollow connector and mounting means typically having telescopic interconnection.

An additional object includes provision of a projection on the mounting means to connect the mounting means sidewardly to a circuit board.

Further objects include the provision of spring fingers on the mounting means to connect to the LED, and a flange on the mounting means to connect to a mounting panel.

These and other objects and advantages of the invention, as well as the details of an illustrative embodiment, will be more fully understood from the following specification and drawings, in which:

DETAILED DESCRIPTION

Figure 1:
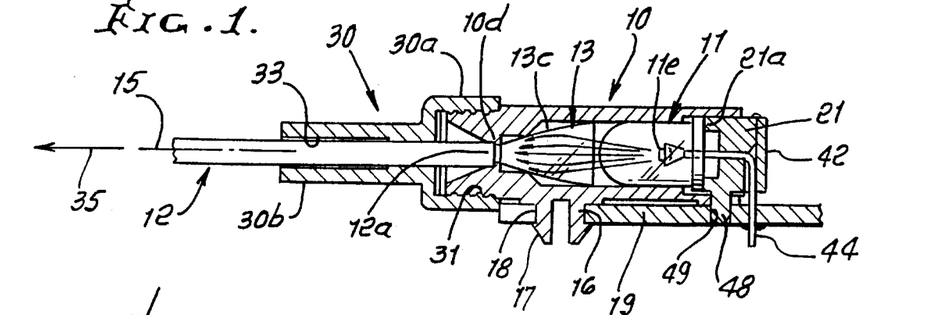
FIG. 1 is a cross section taken through an assembly incorporating the invention.
Figure 2:
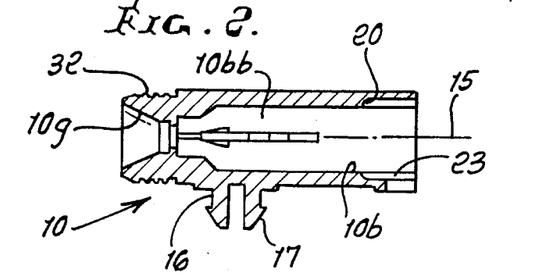
FIG. 2 is an axial section taken through the mounting structure for the LED and light pipe.
Figure 3:
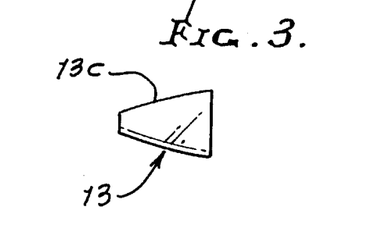
FIG. 3 is an elevation showing the light pipe.
Figure 4:
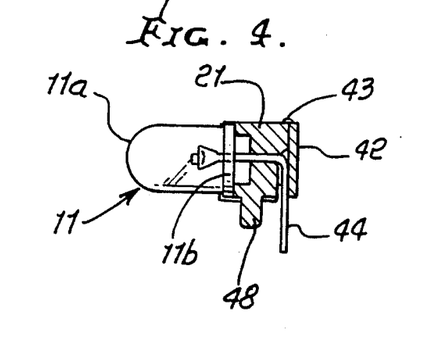
FIG. 4 is an elevation, partly in axial section, showing an LED and its end support.
Figure 5:
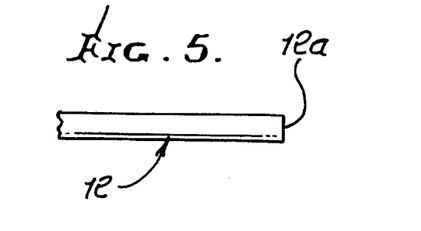
FIG. 5 is a side view showing a fiber optics cable.
Figure 6:
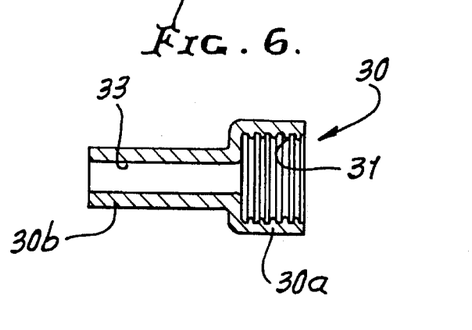
FIG. 6 is an axial section taken through a connector that telescopically connects to the mounting structure and positions the cable.

In the drawings, FIGS. 1–19a, the basic elements include a mounting means, or housing means, indicated generally at 10, an LED 11 received by the tubular mounting means, a fiber optics cable 12 also received by the mounting means in axially spaced relation to the LED, as seen in FIG. 1; and a light pipe 13 located between the curved lens 11a of the LED, and the light entrance end 12a of the cable. The latter includes a single strand or a bundle of optical fibers terminating at end 12a.

Figure 10:
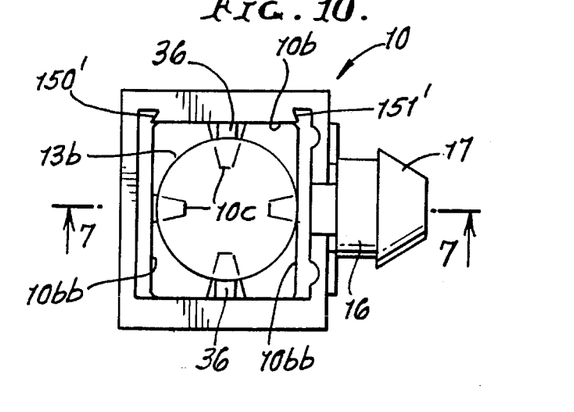
FIG. 10 is an end view taken on lines 10—10 of FIG. 9.
Figure 11:
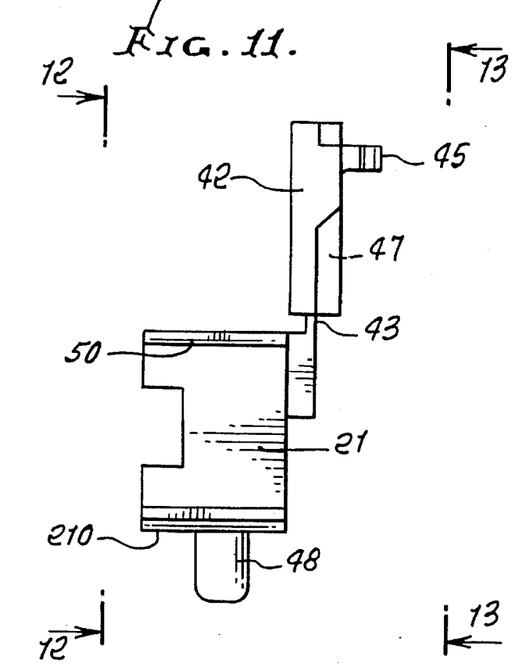
FIG. 11 is an enlarged side elevation showing the LED support that is also seen in FIG. 4, and in as molded condition.
Figure 12:
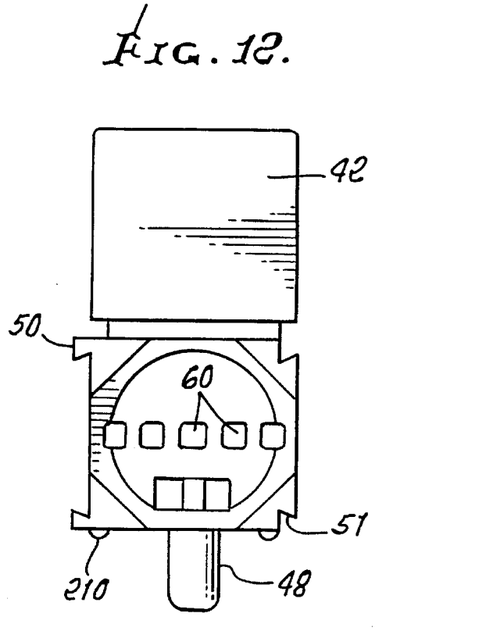
FIG. 12 is an end view taken on lines 12—12 of FIG. 11.

The hollow mounting means 10 may be generally rectangular, as shown in FIG. 10, and has a short bore 10a, elongated walls 10b and 10bb forming a rectangle in cross section, angled, circularly spaced shoulders 10c connecting 10a and 10b, internal flange 10d, smaller short bore at 10e, counterbore 10f at the axially opposite side of the step, and annular flare at 10g. The axis is seen at 15. A projection 16 at the outer side of the housing body has a bayonet connection thereon at 17, to connect into an opening 18 in a circuit board 19, as seen in FIG. 1, to firmly attach the housing to the board.

A shoulder 20 in the housing is adapted to seat the base flange 11b of the LED; and a plug-shaped support 21 is received in the enlarged bore 23 of the housing to retain the LED in position. Grip means, such as barbs, may be located on the periphery of the support 21 to grip the bore 23 and hold the support in position, as shown. Note end 21a of the support engaging the base flange 11b.

Cable connector 30, which is tubular, has an enlarged end 30a, internally barbed at 31, to provide barb rings that press or push connect to the housing at 32. Connector 30 has internal barbs at 33 on its reduced diameter end 30b, to engage and retain the fiber optics cable 12 in predetermined axial position, with outermost annular extent of its end 12a engaging the flange 10d. Therefore, the light-passing optical fibers in the cable terminate at a plane defined by the flange 10d, optically facing toward the LED. The cable may be simply pushed axially into the connector and thereby into position in the housing 10.

The light-reflecting light pipe 13 is conically tapered toward the cable end 12a and has a small end in a plane adjacent flange 10d, and a large end in a plane normal to axis 15, proximate the leftwardmost tip of the LED lens 11a. Planes extending axially longitudinally, in the direction of arrow 35, and containing axis 15, intersect the conical surface 13c of the light pipe along lines concave toward axis 15, as is clear from FIGS. 3 and 7.

Figure 7:
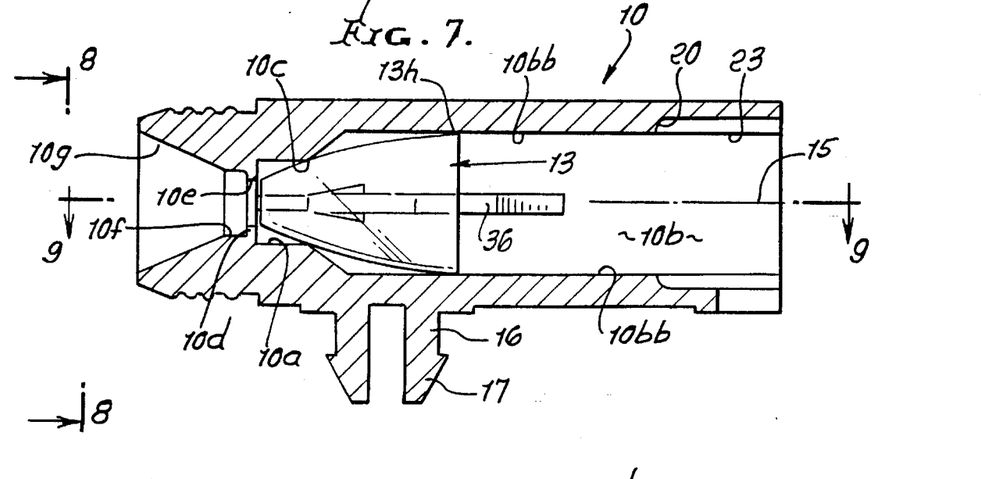
FIG. 7 is an axial section like FIG. 2 but enlarged to show detail, and is taken on lines 7—7 of FIG. 10.
Figure 8:
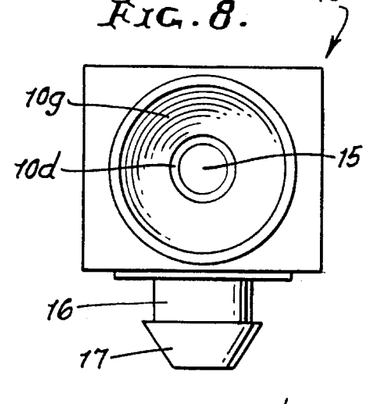
FIG. 8 is an end view taken on lines 8—8 of FIG. 7.
Figure 9:
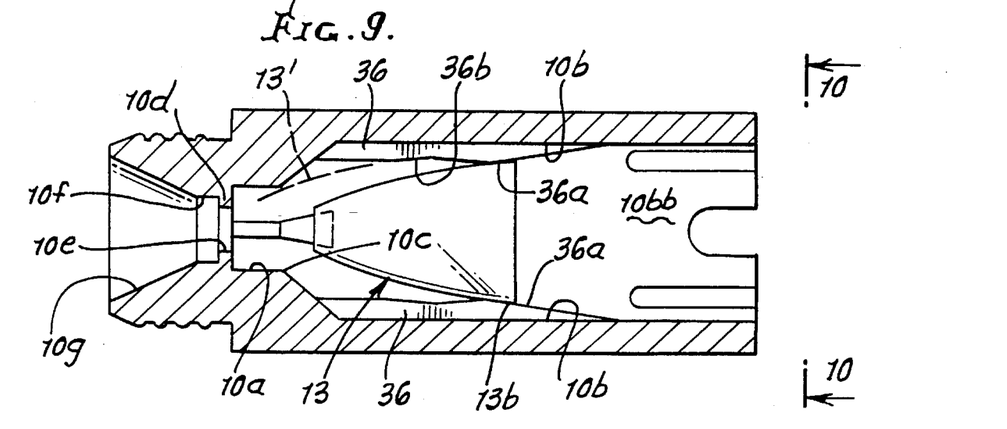
FIG. 9 is an axial section taken through the mounting means but rotated 90° relative to FIG. 7, and is taken on lines 9—9 of FIG. 10.

FIG. 7 shows the positioning of the fully inserted light pipe 13, as by engagement of its nose portion with four of the shoulders 10c spaced about axis 15 (see such shoulders in FIG. 10). Two diametrically opposed, axially extending ridges 36, which are resiliently yieldable, serve to engage the light pipe as it is being endwise inserted. See FIG. 9 with ridge ramps 36a slidably engaging the light pipe at diametrically opposite locations, the ramps having substantially flat surfaces to engage and position the light pipe. The ridges 36 also provide a centering function for the rear portion of the light pipe in fully inserted position. See FIG. 9 showing ridge ramps 36b engaging the light pipe shown in broken lines 13' in fully inserted position.

The inner walls 10bb of the hollow housing 10, i.e., mounting means, support edges 13h of the light pipe in the plane of FIG. 7. The light pipe may consist of molded, transparent plastic material, and may have a reflective (silvered) outer coating facing inwardly to reflect light, as described herein, toward the entrance end of the fiber optics cable. Thus, the light pipe is frictionally held in position, axially, between the cable and LED.

Figure 31:
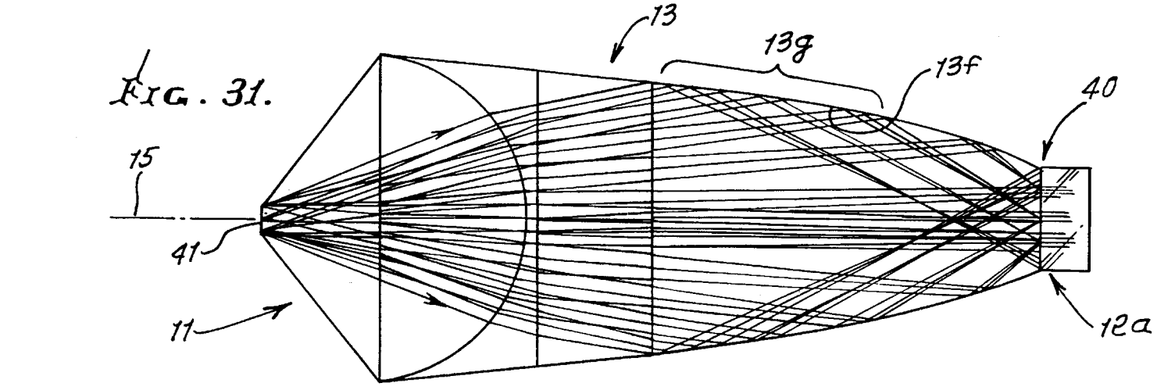
FIG. 31 is a ray trace diagram.
Figure 32:
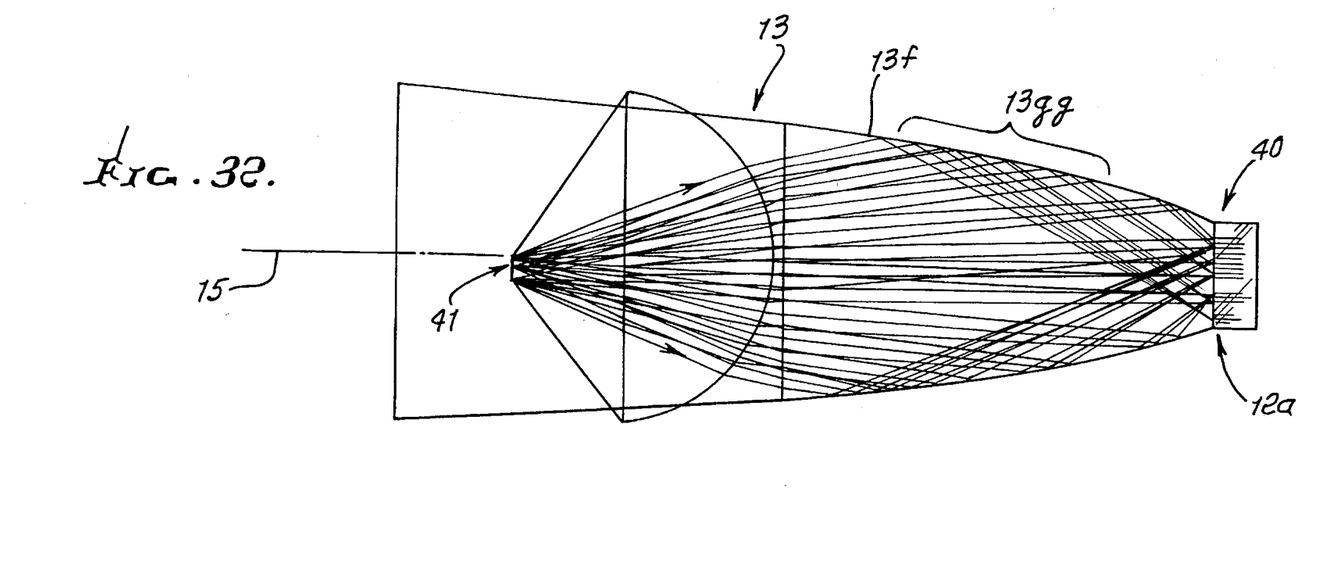
FIG. 32 is another ray trace diagram.

The light pipe is characterized in that light from the LED is always reflected toward the small end of the light pipe, even though the emitter of the LED is off-axis 15. See FIG. 31 schematically showing ray traces toward the small end 40 of the light pipe with the emitter 41 on-axis, and FIG. 32 showing ray traces reflected off the inner side 13f of the light pipe at eccentrically located region 13gg, extending toward the small end 40 of the light pipe with the emitter 41 off-axis, all ray traces arriving at the small end 40 facing the end of the fiber optic cable. Therefore, installation inaccuracies of the LED into the mounting means 60 do not appreciably diminish the light intensity delivered to the end 12a of the fiber optics cable.

Figures 13, 14:
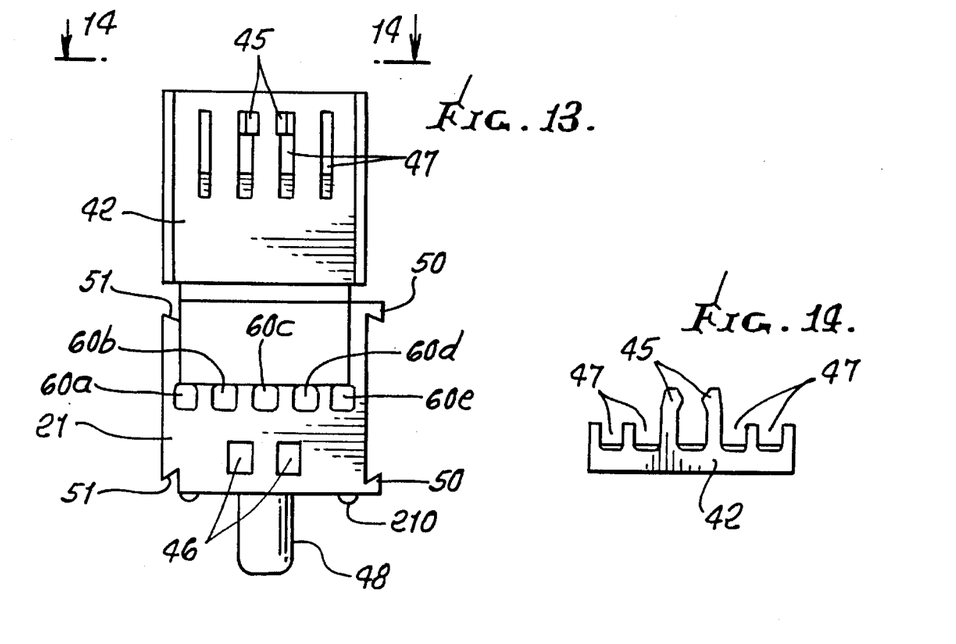
FIG. 13 is an end view taken on lines 13—13 of FIG. 11.
FIG. 14 is a top view taken on lines 14—14 of FIG. 13.
Figure 15:
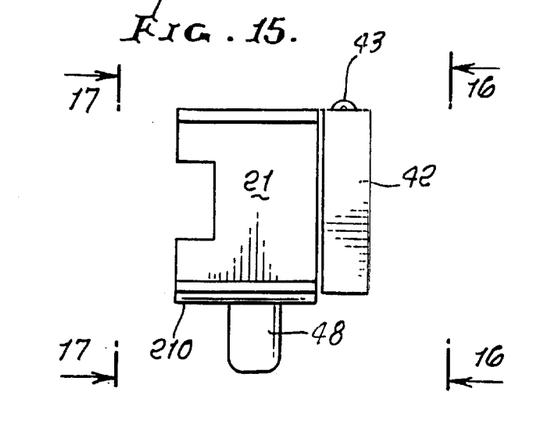
FIG. 15 is a view like FIG. 11 but showing the lens support with an end closure swung downwardly to installed condition.
Figure 16:
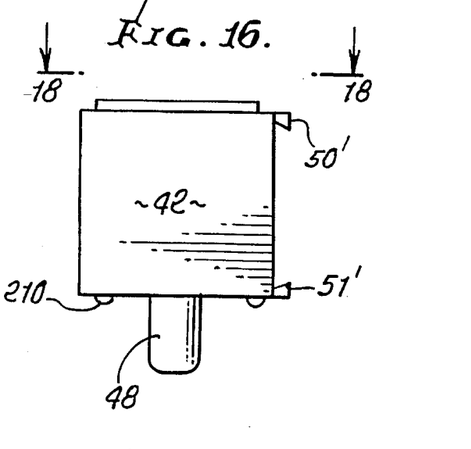
FIG. 16 is an end view taken on lines 16—16 of FIG. 15.
Figure 17:
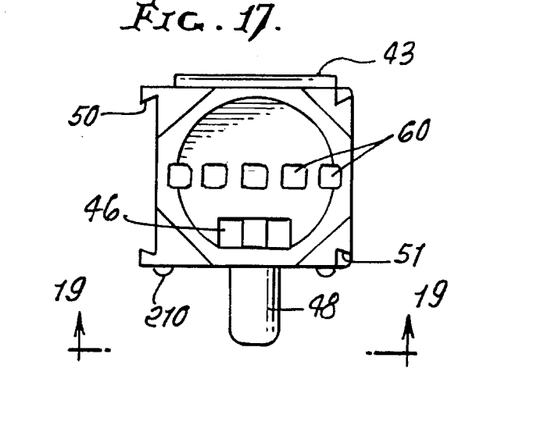
FIG. 17 is an end view taken on lines 17—17 of FIG. 15.
Figure 18:
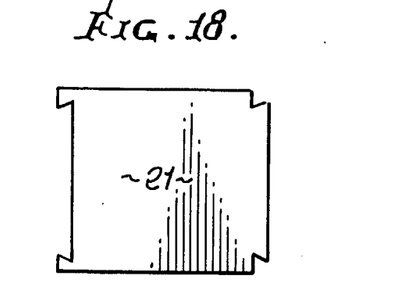
FIG. 18 is a top plan view taken on lines 18—18 of FIG. 16.
Figure 19:
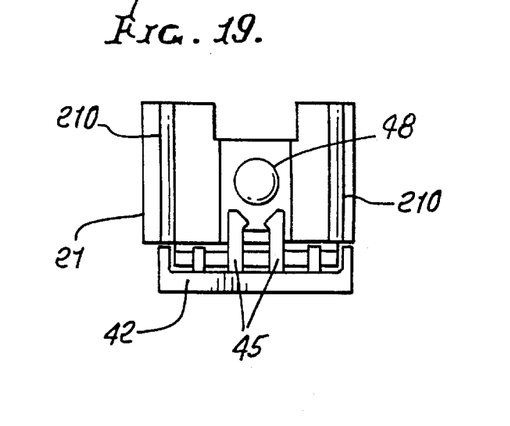
FIG. 19 is a top plan view taken on lines 19—19 of FIG. 17.
Figure 19A:
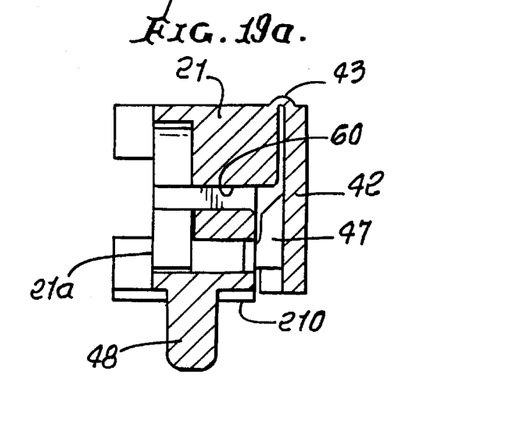
FIG. 19a is a section taken on lines 20—20 of FIG. 19.
Figure 20:
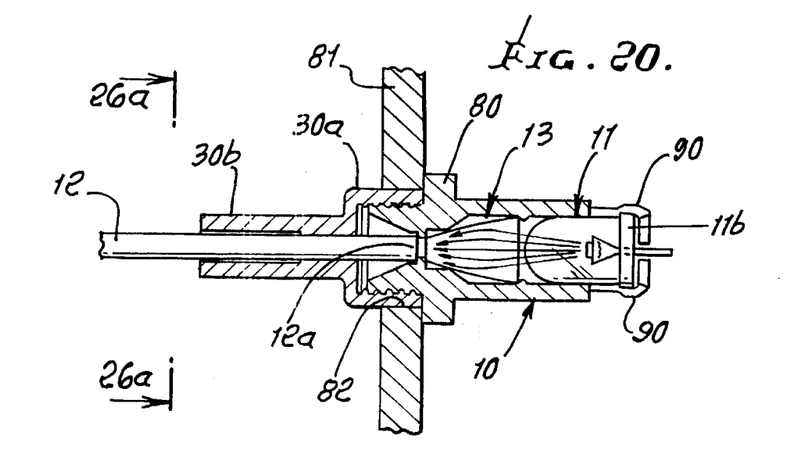
FIG. 20 is a view like FIG. 1 showing another form of the invention.
Figure 21:
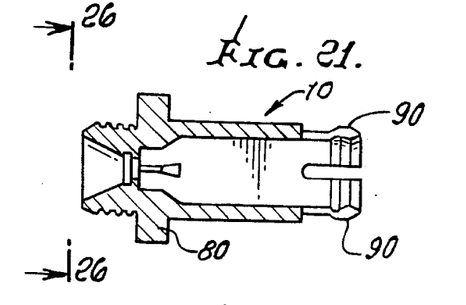
FIGS. 21–25 are views of the FIG. 20 embodiment, in elevation and corresponding to FIGS. 2–6.
Figure 22:
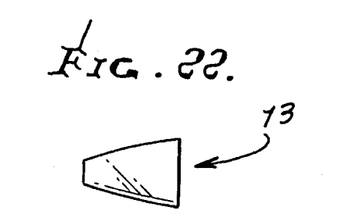
Figure 23:
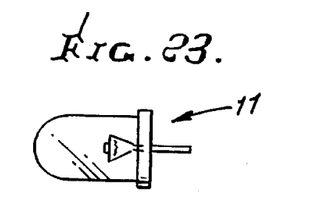
Figure 24:
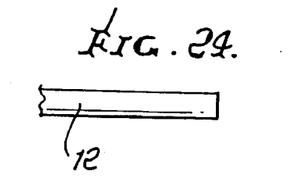
Figure 25:
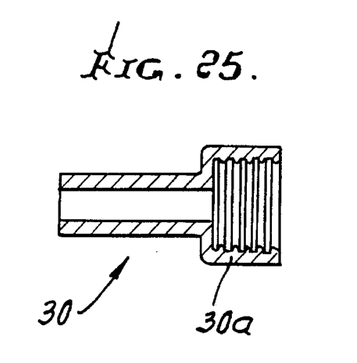

Turning to FIGS. 11–14, the LED end support 21 is shown to have a retention means 42 connected to it, as by web 43. Openings 60 in support 21 pass the LED terminals 44. After the LED terminals 44 are bent downwardly to project toward and through the circuit board, as seen in FIG. 1, the retention means 42, such as a panel, as shown, is then deflected downwardly to cover the exposed terminals. See FIGS. 15–19a. Snap connections may be provided between 42 and 21, as at elements 45 and 46. The LED terminals fit in slots 47 provided on panel 42, as seen in FIG. 14. A part or projection 48, integral with 21, is received in a hole 49 in the circuit board, to position the support 21 and the LED terminals relative to the board.

Dovetailed tongue and groove connections 50 and 51 on 21 may be provided for connection to adjacent supports 21, associated with adjacent units, as seen in FIG. 1. Dovetail tongue and groove connections 50' and 51' seen in FIG. 16 interfit connections 150' and 151' seen in FIG. 10.

Figure 26:
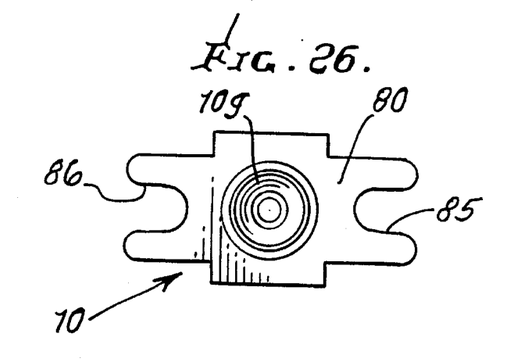
FIG. 26 is an end view of the FIG. 21 housing, and taken on lines 26—26 of FIG. 21.
Figure 26A:
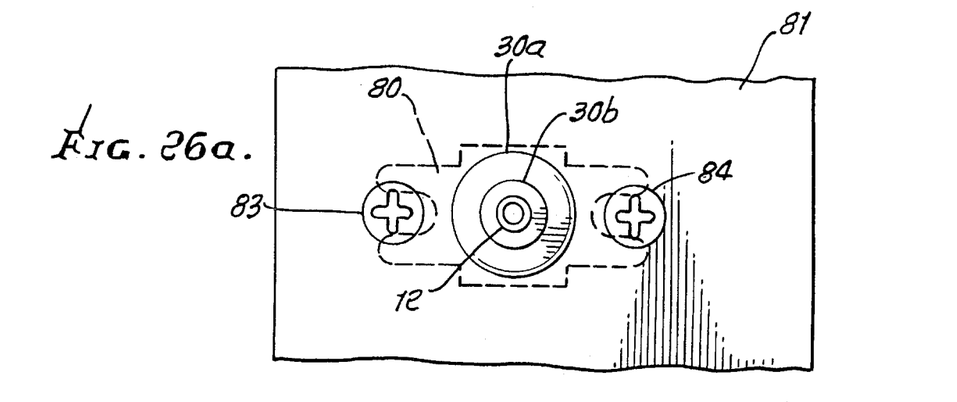
FIG. 26a is a view like FIG. 26 showing attachment to a panel.
Figure 27:
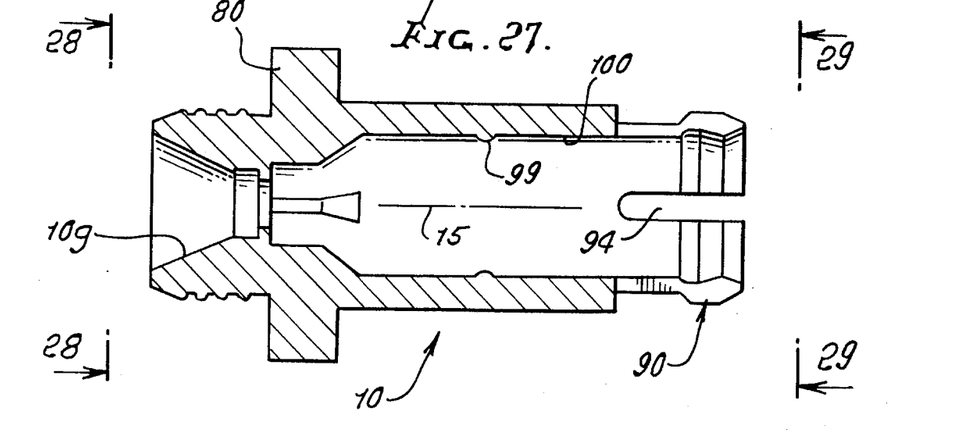
FIGS. 27–29 are views of the FIGS. 20–26 mounting means, and include, respectively, an axial section, in elevation, and end views taken on lines 28—28 and 29—29 of FIG. 22.
Figure 28:
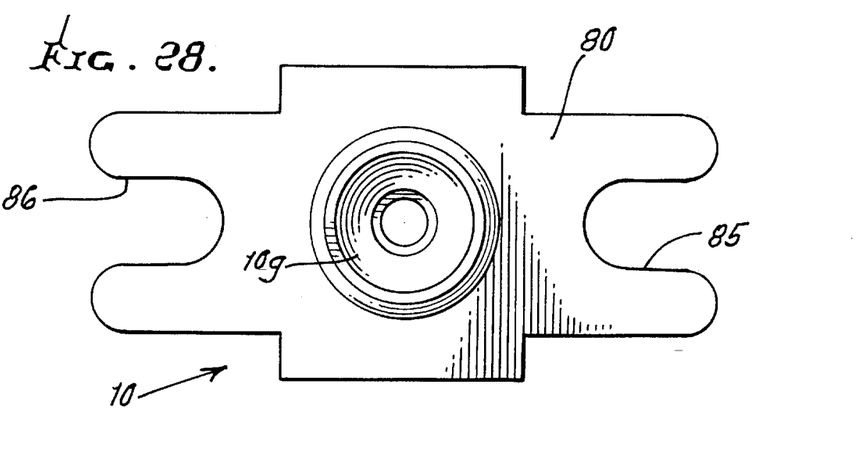
Figure 29:
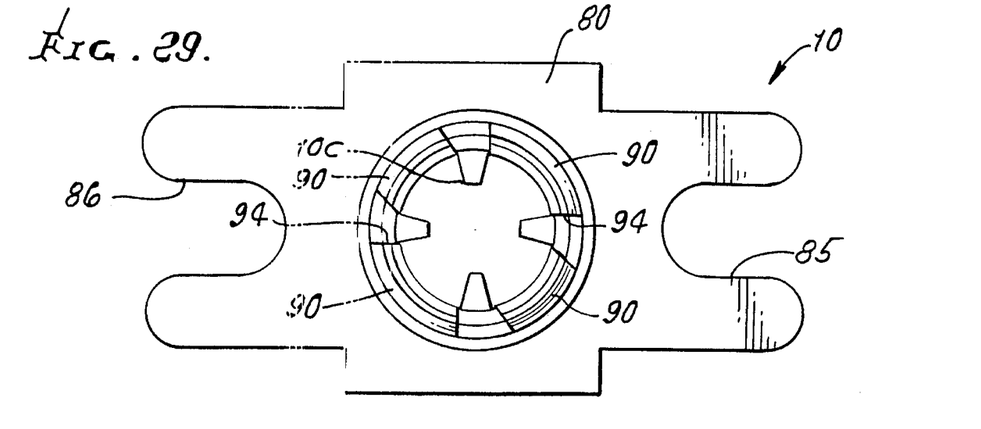
Figure 30:
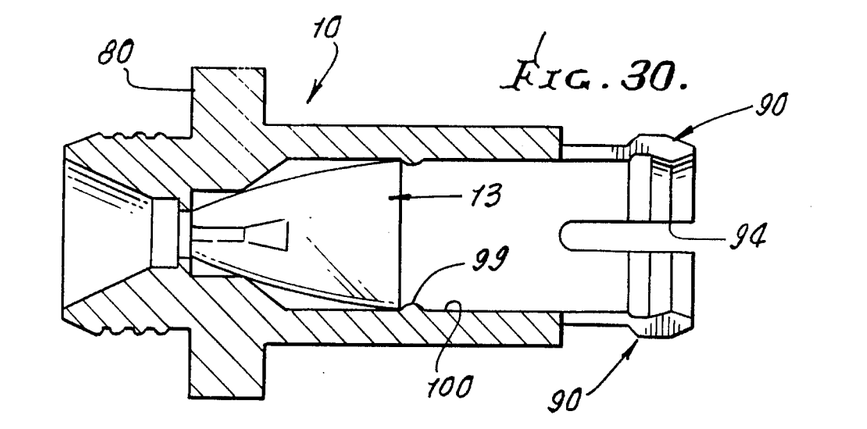
FIG. 30 is a view like FIG. 27 but showing an installed light pipe.

FIGS. 20–25 are views similar to FIGS. 1–6, with corresponding elements bearing the same numerals. In this modification, an integral flange 80 is provided on the mounting means 10, to endwise engage a mounting panel 81. The enlarged end 30a of the connector 30 is assembled to 10 to fit closely within an opening 82 through that panel. As shown in FIGS. 26 and 26a, fasteners 83 and 84 project through slots 85 and 86 in flange 80, and through the panel, to attach the flange to panel 80.

The mounting means in this instance has integral spring fingers 90 that project rightwardly to connect to the LED flange 11b, and position the LED in predetermined relation to the light pipe 13. Note slots 94 separating the spring fingers. See FIGS. 27–30 and my prior U.S. Pat. No. 5,068,771.

Bumps 99 on the tubular bore 100 of 10 position the larger end of the light pipe. See FIG. 30.

Referring back to FIGS. 11–19, the through holes 60 are shown to include five holes, 60a–60e, in a row. Holes 60a, 60c, and 60e are spaced apart to receive three leads of a tri-lead LED; whereas, intermediate holes 60b and 60d are spaced apart to receive the two leads of a bi-lead LED. Protrusions 210 are adapted to support the apparatus in stand-off relation on a circuit board.

Figure 33:
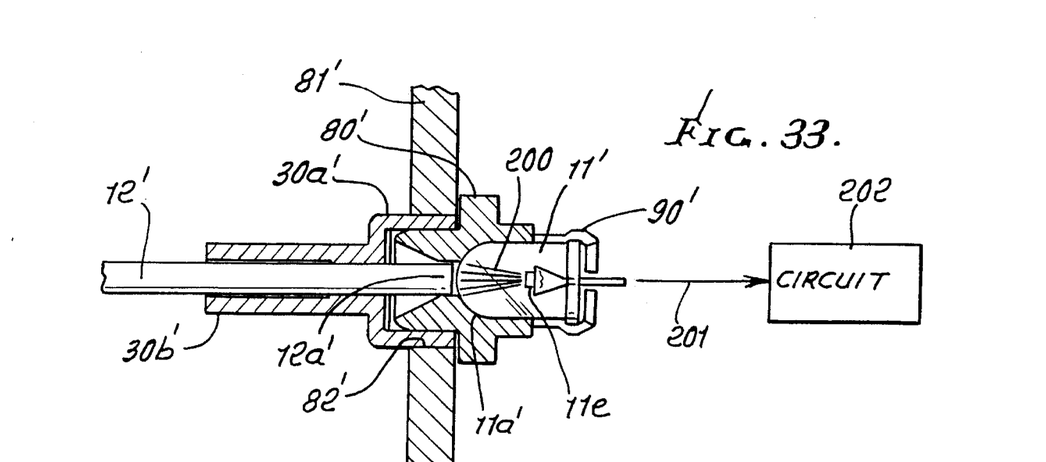
FIG. 33 is a view showing cable transmitted signal detection.

FIG. 33 shows detection of light signals transmitted via cable 12, in response to signal application to that cable, as described above. Elements corresponding to those described possibly bear the same numbers, but which are primed. The LED-type device 11' has a light detector 11e' (instead of an emitter) therein, and the LED-curved envelope or lens 11a' is positioned very close to the end 12a' of the cable. Light rays from the cable end 12a' to the detector element are indicated at 200. Electrical signals are transmitted at 201 from 11e' to the circuitry 202, as on a circuit board.

Spring fingers 90' on the mounting means retain and position the LED device 11' relative to the end of the cable.

I claim:

1. In combination,
   a) a mounting means having a longitudinal axis,
   b) an LED having a light emitter and a light-passing lens oriented along said axis,
   c) a cable having optical fibers defining a light entrance end in a location facing longitudinally toward the LED and spaced therefrom, and
   d) a light-reflecting light pipe located longitudinally between the LED lens and said cable entrance end,
   e) and including a hollow connector connected to said mounting means and having a first portion to receive said cable and to position said cable entrance end at said location, the connector having grip means thereon to grip the cable and to resist endwise withdrawal of the cable relative to said connector and mounting means.

2. The combination of claim 1 wherein said light pipe tapers toward said entrance end.

3. The combination of claim 2 wherein said light pipe has a generally conical surface oriented to reflect light rays from the LED lens toward said cable entrance end.

4. The combination of claim 3 wherein a plane containing said axis intersects said conical surface along lines concave toward said axis.

5. The combination of claim 1 wherein said emitter has a center located at one of the following positions:

on said axis spaced from said axis at a side thereof.

6. The combination of claim 1 wherein said LED lens is convex toward said light pipe.

7. The combination of claim 6 wherein said light pipe has a relatively large entrance end and a relatively small exit end, said entrance end proximate said LED lens, and said exit end proximate said cable entrance end.

8. The combination of claim 1 wherein said mounting means includes a housing in which said light pipe is received.

9. The combination of claim 8 wherein the housing also receives the LED.

10. The combination of claim 8 including means on the mounting means to attach to a panel, outwardly of the connector.

11. The combination of claim 10 including a hole in the panel to receive a portion of the connector that connects to the mounting means.

12. The combination of claim 1 wherein said connector and said mounting means have telescopic interfit.

13. The combination of claim 12 including a mounting panel to which said connector is connected.

14. The combination of claim 13 wherein said panel defines an opening receiving said connector.

15. The combination of claim 1 including a circuit board to which said mounting means is connected.

16. The combination of claim 15 including a projection on said mounting means and received by the circuit board to locate said mounting means relative to said board.

17. The combination of claim 15 wherein the LED has terminals projecting for electrical connection to circuitry on said board.

18. The combination of claim 1 including a circuit board to which said mounting means is connected.

19. The combination of claim 18 including a projection on said mounting means and received by the circuit board to locate said mounting means relative to said board.

20. The combination of claim 1 wherein said grip means comprises barb means on the connector.

21. The combination of claim 1 including an LED support having grip connection to a base defined by the LED, and retention means on the support to retain LED terminals.

22. The combination of claim 21 wherein said retention means includes a closure having hinged connection to the support to swing downwardly and retain LED terminals in position deflected to project toward a circuit board.

23. The combination of claim 21 including a projection on the support for connection to a circuit board.

24. The combination of claim 21 wherein said support has five through openings to pass LED leads, three of said openings spaced apart to pass the three leads of a tri-lead LED, and two of said openings spaced apart to pass the two leads of a bi-lead LED.

25. The combination of claim 1 including means integral with the mounting means to retain the LED in fixed axial position.

26. In combination,
   a) a mounting means having a longitudinal axis,
   b) an LED having a light emitter and a light-passing lens oriented along said axis,
   c) a cable having optical fibers defining a light entrance end in a location facing longitudinally toward the LED and spaced therefrom, and
   d) a light-reflecting light pipe located longitudinally between the LED lens and said cable entrance end,
   e) and including spring fingers on the mounting means retaining the LED in fixed axial position after endwise insertion of the LED between said fingers and into the mounting means.

27. The method of forming a combination that includes:
   a) a mounting means having a longitudinal axis,
   b) an LED having a light emitter and a light-passing lens oriented along said axis,
   c) a cable having optical fibers defining a light entrance end in a location facing longitudinally toward the LED and spaced therefrom, and
   d) a light-reflecting light pipe located longitudinally between the LED lens and said cable entrance end, said method including attaching said mounting means containing said LED and light pipe to a support structure, and then endwise inserting said cable into said mounting means to bring said entrance end into said location, and including providing a cable connector, attaching the connector to said mounting means, and providing grip means on the connector to grip the cable and hold the cable at said location.

28. The method of claim 27 including providing said support structure in the form of one of the following:

a circuit board a panel defining an opening receiving said mounting means.

29. In combination,
   a) a mounting means having a longitudinal axis,
   b) an LED having a light emitter and a light-passing lens oriented along said axis,
   c) a cable having optical fibers defining a light entrance end in a location facing longitudinally toward the LED and spaced therefrom, d) a light-reflecting light pipe located longitudinally between the LED lens and said cable entrance end, e) and including a detector operatively coupled to the cable to detect light signals transmitted by the cable.

30. The combination of claim 29 wherein the detector includes an LED-type device having an envelope proximate an end of the cable, and there being mounting means for said device having spring fingers retaining and positioning the device.

* * * * *